(12) United States Patent
Torok et al.

(10) Patent No.: US 9,256,402 B2
(45) Date of Patent: Feb. 9, 2016

(54) END USER PROGRAMMING FOR A MOBILE DEVICE

(71) Applicant: International Business Machines Corporation, Armonk, NY (US)

(72) Inventors: Kenneth C. Torok, Folsom, CA (US); Terrence E. White, Cottage Grove, MN (US)

(73) Assignee: International Business Machines Corporation, Armonk, NY (US)

( * ) Notice: Subject to any disclaimer, the term of this patent is extended or adjusted under 35 U.S.C. 154(b) by 56 days.

(21) Appl. No.: 14/025,957

(22) Filed: Sep. 13, 2013

(65) Prior Publication Data

US 2015/0082273 A1    Mar. 19, 2015

(51) Int. Cl.
  *G06F 9/44*       (2006.01)
  *G06Q 10/06*  (2012.01)
  *G06F 3/0484*     (2013.01)

(52) U.S. Cl.
  CPC *G06F 8/34* (2013.01); *G06Q 10/06* (2013.01); *G06F 3/0484* (2013.01)

(58) Field of Classification Search
  CPC .......... G06F 8/34; G06F 3/0484; G06Q 10/06
  See application file for complete search history.

(56) References Cited

U.S. PATENT DOCUMENTS

| | | | |
|---|---|---|---|
| 8,239,840 B1 * | 8/2012 | Czymontek | G06F 8/34 717/125 |
| 8,261,231 B1 | 9/2012 | Hirsch et al. | |
| 8,479,154 B1 * | 7/2013 | Friedman | 717/106 |
| 8,892,679 B1 * | 11/2014 | Destagnol et al. | 709/213 |
| 9,047,404 B1 * | 6/2015 | Jibaly | G06F 11/362 |
| 9,134,895 B2 * | 9/2015 | Dove | G06F 3/0488 |
| 2002/0120929 A1 | 8/2002 | Schwalb et al. | |
| 2007/0066364 A1 * | 3/2007 | Gil et al. | 455/566 |
| 2007/0240046 A1 * | 10/2007 | Yan | G06Q 10/06 715/700 |
| 2011/0004839 A1 * | 1/2011 | Cha et al. | 715/765 |
| 2011/0161912 A1 * | 6/2011 | Eteminan et al. | 717/101 |
| 2012/0005577 A1 * | 1/2012 | Chakra | G06F 3/0486 715/702 |
| 2012/0078597 A1 * | 3/2012 | Ishaq et al. | 703/6 |

(Continued)

FOREIGN PATENT DOCUMENTS

CN    100464574 C    2/2009

OTHER PUBLICATIONS

Nikolai Tillmann et al., "TouchDevelop: Programming Cloud-Connected Mobile Devices via Touchscreen", [Online], 2011, pp. 49-60, [Retrieved from Internet on Sep. 17, 2015], <http://delivery.acm.org/10.1145/2050000/2048245/p49-tillmann.pdf>.*

(Continued)

*Primary Examiner* — Thuy Dao
*Assistant Examiner* — Ziaul A Chowdhury
(74) *Attorney, Agent, or Firm* — Maeve McCarthy

(57) ABSTRACT

A tool for creating and editing applications on a mobile device. The tool searches the mobile device for a plurality of currently installed applications on the mobile device. The tool exposes a workspace using a graphical programming language on the mobile device. The tool receives a plurality of selections in the workspace. The tool receives a configuration of the plurality of received selections in the workspace. The tool determines, based on the configuration of the received selections in the workspace, the application is complete. The tool prompts to save the completed application.

20 Claims, 4 Drawing Sheets

(56) References Cited

U.S. PATENT DOCUMENTS

| | | | | |
|---|---|---|---|---|
| 2012/0159401 | A1* | 6/2012 | Pahud | G06F 3/04886 |
| | | | | 715/863 |
| 2013/0104099 | A1* | 4/2013 | Gores et al. | 717/104 |
| 2013/0152135 | A1 | 6/2013 | Hong et al. | |
| 2013/0205278 | A1* | 8/2013 | Hirsch et al. | 717/121 |
| 2013/0209108 | A1* | 8/2013 | Krishnakumar et al. | 398/130 |
| 2013/0238384 | A1* | 9/2013 | Caesar et al. | 705/7.27 |
| 2014/0032606 | A1* | 1/2014 | Chandler | G06F 8/34 |
| | | | | 707/798 |
| 2014/0173454 | A1* | 6/2014 | Sanchez | 715/747 |
| 2014/0195990 | A1* | 7/2014 | Jegal | G06F 3/017 |
| | | | | 715/863 |
| 2014/0201328 | A1* | 7/2014 | Zhao | 709/219 |
| 2014/0337414 | A1* | 11/2014 | Sojoodi et al. | 709/203 |
| 2014/0351684 | A1* | 11/2014 | Smit | G06Q 10/06 |
| | | | | 715/222 |
| 2014/0365904 | A1* | 12/2014 | Kim | G06F 3/0484 |
| | | | | 715/741 |
| 2015/0046914 | A1* | 2/2015 | Sahoo | 717/166 |

OTHER PUBLICATIONS

Ashwin Manjunatha et al. "Power of Clouds in Your Pocket: An Efficient Approach for Cloud Mobile Hybrid Application Development", [Online], 2010, pp. 496-503, [Retrieved from Intternet on Sep. 17, 2015], <http://ieeexplore.ieee.org/stamp/stamp.jsp?tp=&arnumber=5708492>.*

Ajith Ranabahu et al., "A Domain Specific Language for Enterprise Grade Cloud-Mobile Hybrid Applications", [Online], 2011, pp. 77-83, [Retrieved from Internet on Sep. 17, 2015], <http://delivery.acm.org/10.1145/2100000/2095064/p77-ranabahu.pdf>.*

G. Breiter et al., "Software defined environments based on TOSCA in IBM cloudimplementations", [Online], 2014, pp. 1-10, [Retrieved from Interenet on Sep. 17, 2015], <http://ieeexplore.ieee.org/stamp/stamp.jsp?tp=&arnumber=6798738>.*

Non- Final Office Action from U.S. Appl. No. 14/025,999 dated Sep. 25, 2014.

Response filed on Dec. 16, 2014 to Non-Final Office Action dated Sep. 25, 2014 in U.S. Appl. No. 14/025,999.

Lieberman et al., "End-User Development: An Emerging Paradigm", pp. 1-8, © 2006 Kluwer Academic Publishers, Printed in the Netherlands.

U.S. Appl. No. 14/025,999, filed Sep. 13, 2013, Torok et al., "End User Programming for a Television Multimedia Device".

Pajunen et al., "Developing Workflow Engine for Mobile Devices", 11th IEEE International Enterprise Distributed Object Computing Conference, pp. 279-286, DOI 10.1109/EDOC.2007.32, 1541-7719/07 $25.00 © 2007 IEEE.

* cited by examiner

END USER PROGRAMMING FOR A MOBILE DEVICE

BACKGROUND

1. Field of the Invention

The present invention relates generally to the field of application development, and more particularly to end user programming of mobile phone applications.

2. Description of the Related Art

Mobile devices, such as smart phones, tablets, and other handheld devices have become widespread and important to the daily activities of many consumers and businesses. Traditionally, these types of devices have primarily served as communications devices. Recently, however, consumers are increasingly relying upon these devices as an integral tool in the performance of a wide-range of personal and work-related tasks. In response, mobile phones and other wireless handheld devices have evolved into complex computing devices with equally complex computer hardware and software.

While many of these mobile devices continue to be used for various forms of communication (i.e., voice calls and text messages), they also generally provide other various functionalities, including accessing and displaying websites, sending and receiving e-mails, taking and displaying photographs and videos, playing music and other forms of audio, etc. These, and numerous other functionalities, are generally performed by software components that are built in to the device's mobile operating system, or separate mobile applications (apps) that run on top of the mobile operating system. Recently, development and use of mobile apps has become prolific, and thousands of apps now exist across a wide array of mobile devices.

The goal of human-computer interaction is evolving from making systems easy to use, to making systems that are easy to develop. Mobile phone application developers have spent an enormous amount of time and effort delivering new functionality to consumers that promise to give them greater flexibility and control over their mobile phone's vast capabilities. Mobile applications installed on the device have become the vessel that delivers this functionality to the end user. Developing new or modified applications that effectively support end users' goals has been a task reserved for application developers with considerable expertise in programming that cannot be expected from most people. Therefore, decisions regarding the needs and preferences of end users employing available features lie with the developer. Given that individual end user requirements are diversified, changing, and at times hard to identify precisely, working through conventional development cycles with application developers to keep pace with evolving contexts proves slow, time-consuming, and expensive.

Flexibility really means that end users themselves should be able to develop, customize, and continuously adapt applications to suit individualized needs. Therefore, means to empower end users to realize this type of flexibility, at a level of complexity appropriate for their individual skills and situations, not only makes better use of all available features on a mobile device, but also claims for all end users an ability to control how to utilize the wide array of functions on their mobile devices.

Business Process Model and Notation (BPMN) workflow technology is a standard for business process modeling that provides graphical notation for specifying business processes in diagram based on flowcharting techniques. A workflow is a depiction of a sequence of operations declared as work of a simple or complex mechanism or of machines. A workflow application is a software application which automates, at least to some degree, a process or processes. The processes are usually business-related, but it may be any process that requires a series of steps that can be automated via software. The BPMN specification provides a mapping between the graphics of the notation and the underlying constructs of execution languages, particularly Business Process Execution Language (BPEL). Business Process Modeling (BPM) suite software provides programming interfaces (i.e., application program interfaces) that allow applications to be built to leverage the BPMN engine.

SUMMARY

Aspects of an embodiment of the present invention disclose a method, system, and computer program product for creating and editing applications on a mobile device. The method includes searching the mobile device for a plurality of features exposed by the currently installed applications on the mobile device. The method includes exposing a workspace, which is based on a graphical programming language, on the mobile device. The method includes receiving a plurality of selections within the workspace, wherein the plurality of selections that are received include at least one of a first activity from a first application, a symbol representing a programming function, and a second activity from a second application. The method includes determining a workflow application is complete based on a configuration of the plurality of selections that are received. The method includes prompting to save the workflow application.

DETAILED DESCRIPTION

Figure 1:
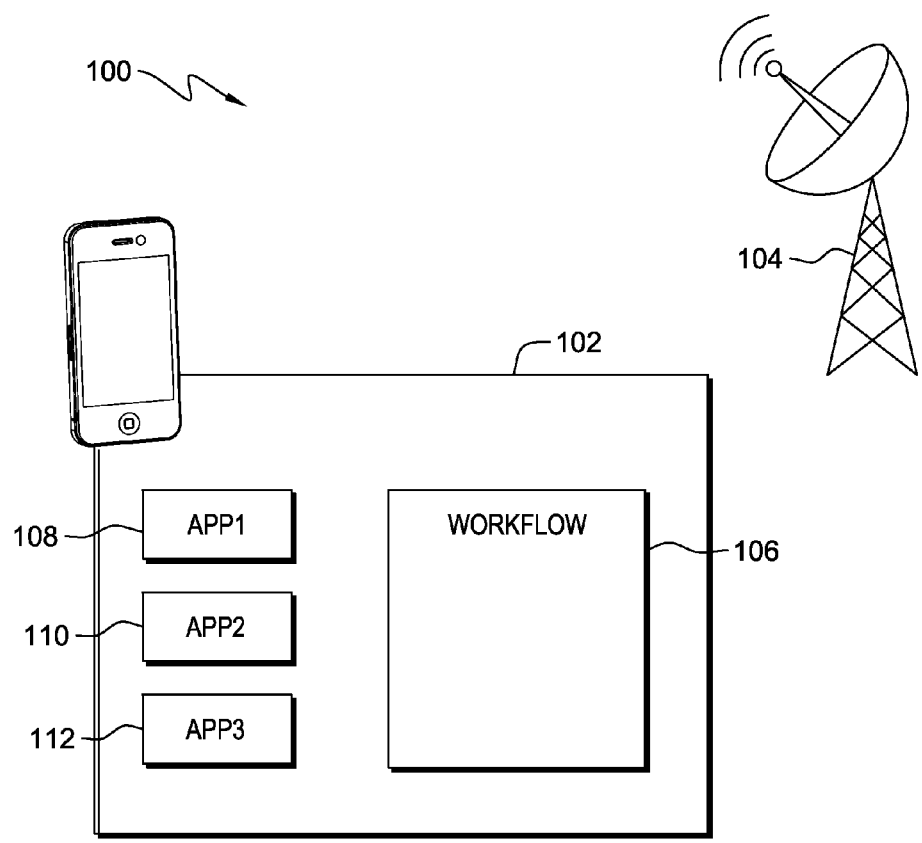
FIG. 1 is a functional block diagram illustrating a data processing environment, generally designated 100, in accordance with an exemplary embodiment of the present invention.

Embodiments of the present invention provide an end user with the capability to customize discrete functionality of their mobile device by allowing them to access a workflow application interface inside the mobile device. Implementation of such embodiments may take a variety of forms, and exemplary implementation details are discussed subsequently with reference to the Figures.

As will be appreciated by one skilled in the art, aspects of the present invention may be embodied as a method, system, or computer program product. Accordingly, aspects of the present invention may take the form of an entirely hardware embodiment, an entirely software embodiment (including firmware, resident software, micro-code, etc.), or an embodiment combining software and hardware aspects that may all generally be referred to herein as a "circuit," "module," or "system." Furthermore, aspects of the present invention may take the form of a computer program product embodied in one or more computer-readable media having computer readable program code/instructions embodied thereon.

Any combination of computer-readable media may be utilized. Computer-readable media may be a computer-readable signal medium or a computer-readable storage medium. A computer-readable storage medium may be, for example, but is not limited to, an electronic, magnetic, optical, electromagnetic, infrared, or semiconductor system, apparatus, or device, or any suitable combination of the foregoing. More specific examples (a non-exhaustive list) of a computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain, or store, a program for use by, or in connection with, an instruction execution system, apparatus, or device.

A computer-readable signal medium may include a propagated data signal with computer-readable program code embodied therein, for example, in baseband or as part of a carrier wave. Such a propagated signal may take any of a variety of forms including, but not limited to, electro-magnetic, optical, or any suitable combination thereof. A computer-readable signal medium may be any computer-readable medium that is not a computer-readable storage medium and that can communicate, propagate, or transport a program for use by, or in connection with, an instruction execution system, apparatus or device.

Program code embodied on a computer-readable medium may be transmitted using any appropriate medium including, but not limited to, wireless, wireline, optical fiber cable, RF, etc., or any suitable combination of the foregoing.

Computer program code for carrying out operations for aspects of the present invention may be written in any combination of one or more programming languages, including an object oriented programming language such as Java®, Smalltalk, C++ or the like, and conventional procedural programming languages, such as the "C" programming language or similar programming languages. The program code may execute entirely on a user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions that execute via the processor of the computer or other programmable data processing apparatus, create means for implementing the functions/acts specified in the flowchart and/or block diagram block or blocks.

These computer program instructions may also be stored in a computer-readable medium that can direct a computer, other programmable data processing apparatus, or other devices to function in a particular manner, such that the instructions stored in the computer-readable medium produce an article of manufacture including instructions that implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus, or other devices to produce a computer-implemented process such that the instructions that execute on the computer or other programmable apparatus provide processes for implementing the functions/acts specified in the flowchart and/or block diagram block or blocks.

The present invention will now be described in detail with reference to Figures. FIG. 1 illustrates an exemplary data processing environment, generally designated 100, including a mobile device 102 and a network 104, in accordance with an exemplary embodiment of the present invention.

In the exemplary embodiment, mobile device 102 may be any suitable type of mobile device capable of running mobile applications, including a smart phone, tablet, slate, or any type of device that runs a mobile operating system (i.e., Apple® iOS, Android™, Symbian™, Blackberry® OS, Windows® Mobile, and Windows® Phone). Mobile device 102 includes a workflow 106 and one or more mobile applications (apps), such as an app 108, app 110, and app 112. Mobile device 102 is capable of communicating with one or more mobile devices, networks, and electronic devices or computing systems capable of sending and receiving data through network 104. Network 104 may include wire cables, wireless communication links, fiber optic cables, routers, switches and/or firewalls.

As used herein, "application," "mobile application," or "app" encompasses application software that runs on (or is capable of running on) mobile devices and performs specific tasks for the mobile device's user. In general, applications encompass any software file comprising instructions that can be understood and processed on a computing device such as for example, executable files, library modules, object files, script files, interpreter files, executable modules and the like. An application may be capable of being decompiled (decompiling is a process of translating a file, such as an executable file, containing information at a relatively low level of abstraction, such as assembly language, into a higher level of abstraction that may be human readable, such as programming languages like C++ or Business Process Model and Notation). Applications may include native applications (pre-installed on the mobile device by a vendor) such as address books, calendars, calculators, games, maps, and Web browsers. Applications may also be downloaded from a plurality of application software distribution platforms via network 104 for execution on a mobile device, such as mobile device 102.

In the exemplary embodiment, an application, for example app 112, may be a non-mobile application created by workflow 106.

In the exemplary embodiment, workflow 106 is a mobile application installed on a mobile device, such as mobile device 102. Workflow 106 is configured to communicate with other mobile applications installed on mobile phone 102, such as app 108, app 110, and app 112. Workflow 106 is configured to customize discrete functionality delivered by one or more applications installed on a mobile device by linking together features from a plurality of applications installed on the mobile device to create a hybrid application. Workflow 106 operates on a graphical programming language, such as the Business Process Model and Notation (BPMN) language, utilizing a plurality of BPMN workflow symbols including, but not limited to, an activity, a sequence flow, a gateway, a parallel process, a start and an end, an event, and a looping function, to provide a graphical representation of one or more computer processes.

An activity symbol in workflow 106 represents a distinct feature (i.e., using a camera on the mobile device to take a picture, or accessing a contact list on the mobile device to search for an e-mail address) provided by an application, such as app 108, installed on mobile device 102. Activity symbols enable workflow 106 to use discrete functionality made available by one or more applications installed on the mobile device. For example, on an Android mobile device, the ability to use discrete functionality made available by one or more applications may be enabled by use of "Intents," an aspect of the Android application programming interface (API). On an iPhone®, use of discrete functionality made available by one or more applications may be enabled by use of "URL Schemes," an aspect of the iPhone® API. Workflow 106 allows a mobile device user, such as an end user, to develop applications that customize the functionality of one or more services provided by their mobile device. For example, some common services that may be performed using an activity in workflow 106 include, but are not limited to, launch an application at a specific time, receive RSS data feeds from a provider, access a web site, send a text message, play music from a playlist, and access functions made available by other custom-built applications installed on the phone.

A sequence flow symbol in workflow 106 enables end users to link sequential or parallel activities to accomplish a plurality of tasks. For example, workflow 106 enables an end user to set a sequence flow linking an activity, such as launch a Kindle reader app, to another activity, such as play music from a classic music playlist.

A gateway symbol in workflow 106 enables end users to decide if they want to follow a sequence flow leading to an activity based on a condition. The gateway symbol functions as decision logic where one or more activities may or may not launch based on some condition. For example, workflow 106 enables an end user to automate a sequence flow to launch the ESPN Radio app only if the current day is Sunday.

A parallel processing symbol in workflow 106 enables end users to configure parallel processing paths where a plurality of activities can run simultaneously. For example, workflow 106 enables an end user to configure a plurality of activities, such as launch the Kindle reader app, launch Pandora, and direct all incoming calls to voicemail, to simultaneously commence at 5:00 PM.

A start and an end symbol in workflow 106 enables end users to configure an app to manually start and end, start and end on the occurrence of some event, or any combination thereof. Typically, starting and ending an app is based on some form of automation, such as timing events or occurrences in the mobile device. For example, workflow 106 enables an end user to configure an app, such as FOX Live broadcast, to start automatically when the phrase "Anthony Weiner" is mentioned in the FOX RSS feed.

An event symbol in workflow 106 enables end users to configure apps to send and receive intermediate events for determining a sequence flow to traverse in the process logic. For example, workflow 106 enables an end user to configure an app created to monitor a data feed from ESPN and send an alert whenever the score of a football game changes.

A looping function symbol in workflow 106 enables end users to configure a process to run for a predetermined number of cycles prior to ending, configure a process to run until a predetermined condition is resolved, or configure a process to run until the end user manually ends the loop.

Figure 2:
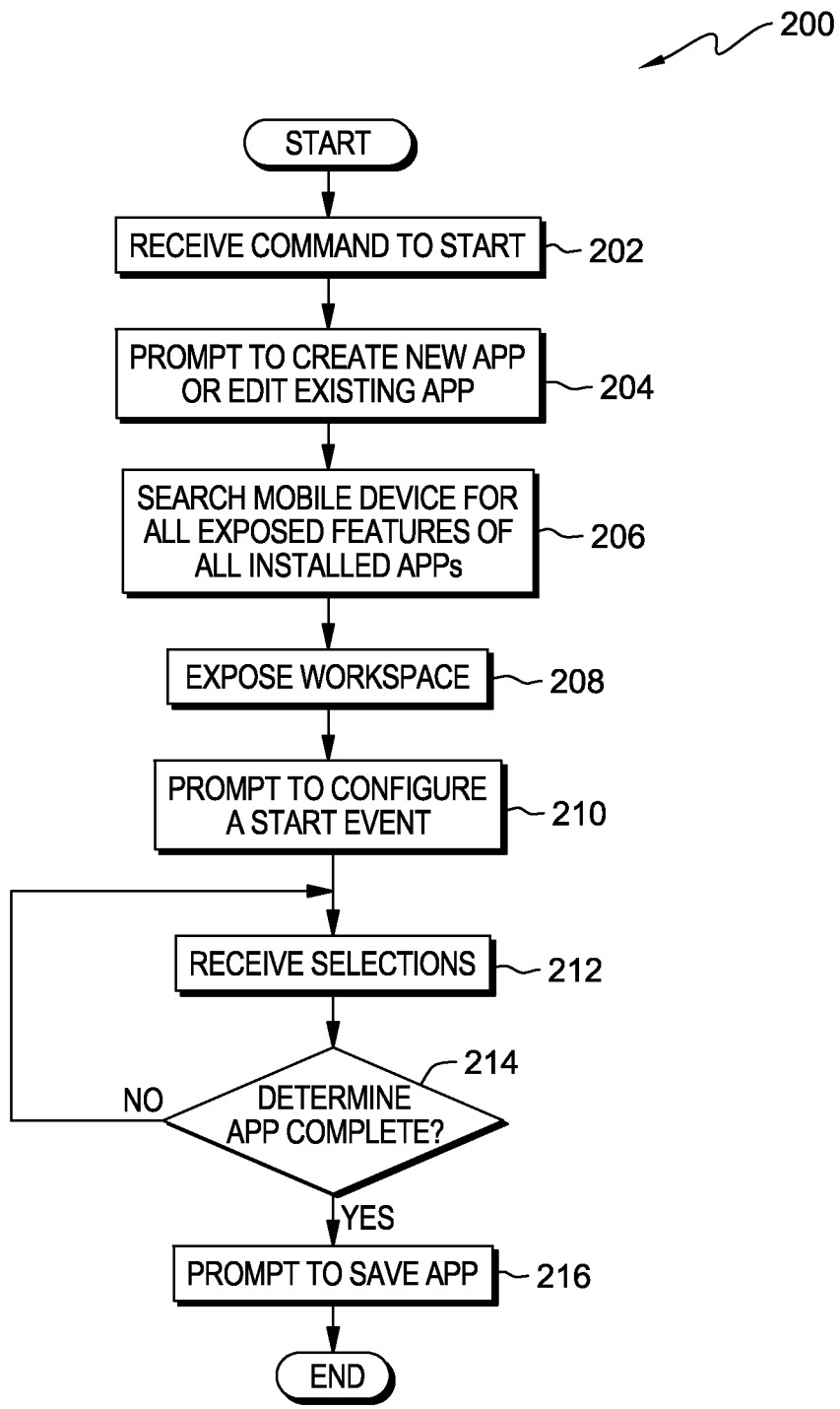
FIG. 2 is a flowchart depicting an exemplary process flow for creating a hybrid application, in accordance with an embodiment of the present invention.

FIG. 2 is a flowchart 200 depicting the steps of workflow 106 for creating and editing a hybrid application, in accordance with an embodiment of the present invention. In one embodiment of the present invention, the hybrid application may be developed by an end user.

Workflow 106 receives a command to start (step 202). In the exemplary embodiment, workflow 106 receives the command to start when an end user selects an icon on their mobile device representing workflow 106. The icon representing workflow 106 may be presented in the form of, or include, a representative character or symbol. For example, the icon may take the form of a character or symbol that implies the building or customization aspects of workflow 106, such as wrench or interlocking gears. In another embodiment, any other suitable character or graphical depiction may be used to identify workflow 106.

In response to receiving a command to open, workflow 106 prompts to create a new app or edit an existing app (step 204). In the exemplary embodiment, workflow 106 issues a prompt to the end user to create a new app or edit an existing app by exposing a window that presents certain options, such as the option to create a new app and edit an existing app. The end user may select either option to confirm that the end user wishes to proceed to the next step within workflow 106. In another embodiment, workflow 106 may expose a window that presents certain options in addition to the options to create a new app or edit an existing app, such as a settings option that allows the end user to customize aspects of workflow 106 to suit their individual customization requirements and allow for flexibility in programming style. For example, the settings option may present a plurality of sub-options to the end user, such as a sub-option that allows the end user to enable or disable a user-friendly tool that provides guidance on designing, creating, and modifying apps.

In response to receiving a confirmation to create an app or edit an existing app, workflow 106 searches for all exposed features of all apps currently installed on the mobile device (step 206). In the exemplary embodiment, workflow 106 queries the mobile device for currently installed apps, and generates a list of the apps, along with their discrete functionalities, present on the mobile device. For example, workflow 106 may query the mobile device for currently installed apps every time an end user selects the option to create an app or edit an existing app, and update the list of apps present on the mobile device to reflect any newly installed or newly deleted apps since the last time the end user opened workflow 106.

After completing a search for all exposed features of all apps currently installed on the mobile device, workflow 106 exposes a workspace (step 208). In the exemplary embodiment, workflow 106 displays the workspace, for example a workflow canvas accepting drag-and-drop selections. The workflow canvas can include a plurality of options, features, settings, and symbols related to app design for the end user to select. For example, workflow 106 may display a plurality of symbols based on the BPMN graphical programming language in a drop down box, in an organized folder, or any other suitable display options for viewing such information.

After exposing the workspace, workflow 106 prompts to configure a start event in the workspace (step 210). In the exemplary embodiment, workflow 106 prompts the end user to configure the start event by highlighting a start event symbol automatically placed within a design space of the workflow canvas. The start event may be configured as a timing event, a conditioned event, or a manual start event. For example, an end user may configure the start event to start every day at 5:00 PM. Alternatively, an end user may configure the start event to start whenever the Pandora radio app is opened. In another embodiment, the end user may select the start event symbol and drop it into the design space of the workflow canvas, where the start event is configured prior to dropping it into the design space of the workflow canvas, or configured after it is dropped into the design space of the workflow canvas.

After a start event is configured, workflow 106 receives a plurality of selections in the workspace (step 212). In the exemplary embodiment, workflow 106 receives a plurality of selections from the end user through a drag-and-drop feature where the end user grabs an option, feature, or symbol from, for example, a drop down box in the workflow canvas, and places it within the design space of the workflow canvas. Selections may include activities that represent currently installed applications, functions of currently installed applications, native functions of the mobile device, and BPMN symbols representing programming processes. Workflow 106 displays and updates a graphical representation of the developing app in the design space of the workflow canvas based on the plurality of selections provided by the end user. For example, when the end user selects a first activity, a sequence flow, and a second activity, workflow 106 orients the selections within the design space of the workflow canvas to represent that after completion of the first activity, the process proceeds to the second activity.

Workflow 106 determines whether enough information is provided (e.g., selections) to complete the developing app (decision block 214). In the exemplary embodiment, workflow 106 determines, based on the configuration of the selections, whether the end user has provided enough information to complete the developing app (i.e., to generate the developing app) after the end user completes certain aspects of the development process. For example, workflow 106 may determine whether the end user has provided enough information to complete the developing app after the end user drops an end event into the design space of the workflow canvas. In another example, workflow 106 may determine whether the end user has provided enough information to complete the developing app after the end user has properly configured all elements dropped into the design space of the workflow canvas, such as events, sequence flows, activities, gateways, pools, and swim lanes, etc. In another embodiment, workflow 106 may prompt the end user to indicate whether the developing app is complete. For example, workflow 106 may prompt the end user through a pop up window to select "Complete and Save" or "Continue working." If workflow 106 determines that the end user has provided enough information to complete the developing app (the "YES" branch of decision block 214), or the end user has indicated as such by selecting "Complete and Save," then workflow 106 prompts to save app (step 216). If workflow 106 determines that the end user has not provided enough information to complete the developing app (the "NO" branch of decision block 214), or the end user has indicated as such by selecting "Continue working," then workflow 106 returns to receive selections in the workflow canvas (step 212). In another embodiment, workflow 106 may include a test device or simulator to test the completed app to confirm that the app performs as intended by the end user.

Subsequent to workflow 106 determining that enough information is provided to complete the developing app, workflow 106 prompts to save the completed app (step 216). In the exemplary embodiment, workflow 106 creates a plurality of reference data for the completed app, such as a configuration file or similar data, an icon file, a unique identifier, a file name, and a file name location, etc. For example, workflow 106 may randomly generate reference data for the completed app so that the completed app can be accessed for future use or retrieved for future modification. In another embodiment, workflow 106 may prompt the user to assign a file name, an icon file, and a unique identifier, etc. to the completed app so that the completed app can be accessed (i.e., located) for future use or retrieved for future modification (i.e., editing).

Figure 3:
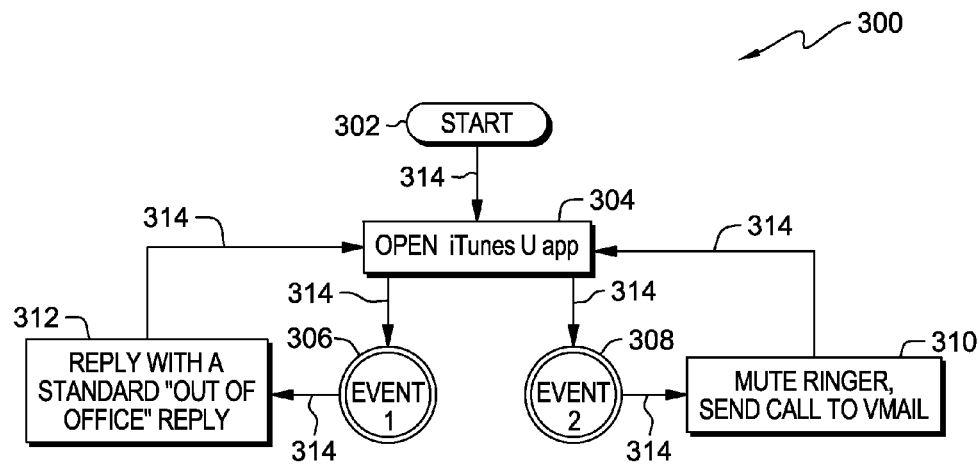
FIG. 3 is a block diagram illustrating a portion of a workflow canvas, including a graphical representation of a first example hybrid app, in accordance with an embodiment of the present invention.

FIG. 3 is a block diagram 300 illustrating a portion of the workflow canvas, including a graphical representation of a first example hybrid app, in accordance with an embodiment of the present invention.

In the first example hybrid app, an end user desires to manage social interruptions, which typically come in the form of text messages and phone calls, while watching recorded lectures on a mobile device, for example, mobile device 102 in data processing environment 100.

Start event 302 is a timing controlled event that starts the first example hybrid app. In the first example hybrid app, start event 302 interrupts any app currently running on the mobile device at 3:00 PM, which is the time that the end user elects to start a recorded lecture. For example, at 3:00 PM, start event 302 interrupts the currently running Pandora radio app and proceeds to close the Pandora radio app.

Start event 302 proceeds through the process, via a sequence flow, such as sequence flow 314, to activity 304. In the first example hybrid app, activity 304 opens the iTunes U app. The first example hybrid app aims to decrease the probability that the end user will be interrupted while watching recorded lectures on the mobile device. In furtherance of this aim, event 306 and event 308 attach to activity 304 to shield the end user from interruptions.

Event 306 is configured to start whenever the end user receives a text message that is not from the end user's girlfriend. In the first example hybrid app, when event 306 receives notification of an incoming text message that is not from the end user's girlfriend, event 306 triggers activity 312, via a sequence flow, to shield the end user from interruption. For example, if the end user receives an incoming text message that is not from the end user's girlfriend, activity 312 responds to the sender with an automated reply message with a standard "Out of Office" reply. Since the end user does not have to type the reply message or send the reply message, the end user is uninterrupted while watching the recorded lecture in the iTunes U app. Alternatively, if the end user receives an incoming text message that is from the end user's girlfriend, an exception configured in event 306 allows the text message to interrupt the end user watching the recorded lecture in the iTunes U app.

Event 308 is configured to start whenever the end user receives a call that is not from the end user's mother. In the first example hybrid app, when event 308 receives notification of an incoming call that is not from the end user's mother, event 308 triggers activity 310, via a sequence flow, to shield the end user from interruption. For example, if the end user receives an incoming call that is not from the end user's mother, activity 310 mutes the ringer on the mobile device and sends the caller directly to voicemail. Since the end user does not hear the ringer, or have to pick up or ignore the call, the end user is uninterrupted while watching the recorded lecture in the iTunesU app. Alternatively, if the end user receives an incoming call that is from the end user's mother, an exception configured in event 308 allows the call to interrupt the end user watching the recorded lecture in the iTunesU app.

Figure 4:
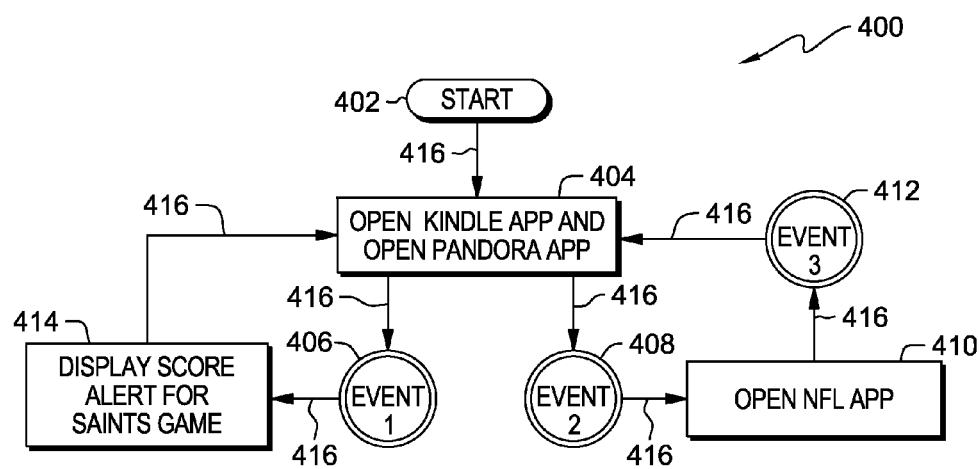
FIG. 4 is a block diagram illustrating a portion of the workflow canvas, including a graphical representation of a second example hybrid app, in accordance with an embodiment of the present invention.

FIG. 4 is a block diagram 400 illustrating a portion of the workflow canvas, including a graphical representation of a second example hybrid app, in accordance with an embodiment of the present invention.

In the second example hybrid app, an end user desires to continuously monitor the score of a football game while listening to music and catching up on reading on a mobile device. The end user desires to open the NFL Mobile app only when the Saints are trailing in the game by more than a touchdown, but wants to receive a scoring alert each time the score changes.

Start event 402 is a timing controlled event that starts the example hybrid app. In the second example hybrid app, start event 402 interrupts any app currently running on the mobile device at 1:00 PM, which is the scheduled time for kickoff. For example, at 1:00 PM, start event 402 interrupts the currently running iTunesU app, and proceeds to close the iTunesU app.

Start event 402 proceeds through the process, via a sequence flow, such as sequence flow 416, to activity 404. In the second example hybrid app, activity 404 opens the Kindle app and the Pandora Radio app. The second example hybrid app aims to continuously monitor the score of a football game while listening to music and reading on the mobile device. In furtherance of this aim, event 406 and event 408 attach to activity 404 to facilitate the end user's multitasking requirements.

Event 406 is configured to use the ESPN RSS feed to monitor the score of the football game, and start whenever the second example hybrid app receives an alert that the score has changed in the football game. In the second example hybrid app, when event 406 receives an alert, event 406 triggers activity 414, via a sequence flow, to further the end user's multitasking requirements. For example, if the second example hybrid app receives an alert that the score changed in the football game, activity 414 displays the score alert for the football game to the end user, for example in a drop down scrolling score ticker, briefly interrupting the Kindle app and the Pandora Radio app.

Event 408 is configured to use the ESPN RSS feed to monitor the score of a football game, and fire whenever the second example hybrid app receives an alert that the score has changed in the football game in a way that causes the Saints to trail by more than a touchdown. Event 408 overrides any other simultaneously triggered event. In the second example hybrid app, when event 408 receives an alert that the score has changed in the football game in a way that caused the Saints to trail by more than a touchdown, event 408 triggers activity 410, via a sequence flow, to further the end user's multitasking requirements. For example, if the second example hybrid app receives an alert that the score changed in the football game in a way that caused the Saints to trail by more than a touchdown, activity 410 opens the NFL Mobile app, where the end user may access extended coverage, such as viewing a streaming broadcast of the game, to monitor the football game.

Event 412 is configured to trigger whenever the end user manually stops the streaming broadcast, or otherwise ends the NFL Mobile app. In the second example hybrid app, when event 412 receives a notification that the end user has closed the NFL Mobile app, event 412 returns to activity 404, via a sequence flow, to further the end user's multitasking requirements, allowing the end user to resume listening to music and reading.

Figure 5:
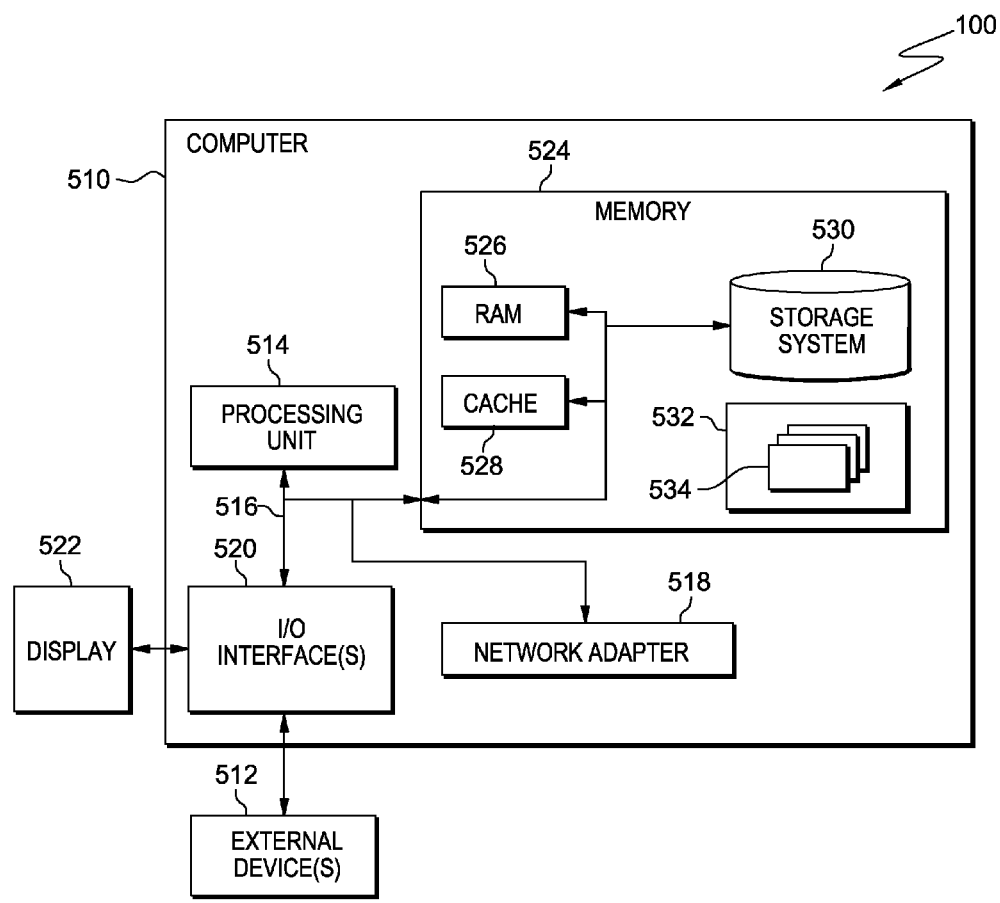
FIG. 5 is a block diagram depicting components of a mobile device in the data processing environment, in accordance with an exemplary embodiment of the present invention.

FIG. 5 is a block diagram 500 depicting the components of a mobile device, such as mobile device 102, of data processing environment 100, in accordance with an exemplary embodiment of the present invention. It should be appreciated that FIG. 5 provides only an illustration of one implementation and does not imply any limitations with regard to the environments in that different embodiments may be implemented. Many modifications to the depicted environment may be made.

Computer system 510 in data processing environment 100 is shown in the form of a general-purpose computing device. However, it should be clear to one skilled in the art that computer system 510 includes mobile devices, tablets, and other suitable devices, for example, mobile device 102. The components of computer system 510 may include, but are not limited to, one or more computer processors or processing units 514, a system memory 524, and a bus 516 that couples various system components including system memory 524 to processor 514.

Bus 516 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system 510 typically includes a variety of computer system readable storage media. Such media may be any available media that is accessible by computer system 510, and it includes both volatile and non-volatile media, removable and non-removable media.

System memory 524 can include computer system readable media in the form of volatile memory, such as random access memory (RAM) 526 and/or cache memory 528. Computer system 510 may further include other removable/non-removable, volatile/non-volatile computer system storage media. By way of example only, storage system 530 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM, or other optical media can be provided. In such instances, each can be connected to bus 516 by one or more data media interfaces. As will be further depicted and described below, system memory 524 may include at least one computer program product having a set (e.g., at least one) of program modules that are configured to carry out the functions of embodiments of the invention.

Program/utility 532, having one or more sets of program modules 534, may be stored in memory 524 by way of example, and not limitation, as well as an operating system, one or more application programs, other program modules, and program data. Each of the operating systems, one or more application programs, other program modules, and program data, or some combination thereof, may include an implementation of a networking environment. Program modules 534 generally carry out the functions and/or methodologies of embodiments of the invention as described herein. Computer system 510 may also communicate with one or more external devices 512 such as a keyboard, a pointing device, a display 522, etc., one or more devices that enable a user to interact with computer system 510 and any devices (e.g., network card, modem, etc.) that enable computer system 510 to communicate with one or more other computing devices. Such communication can occur via Input/Output (I/O) interfaces 520. Still yet, computer system 510 can communicate with one or more networks such as a local area network (LAN), a general wide area network (WAN), and/or a public network (e.g., the Internet) via network adapter 518. As depicted, network adapter 518 communicates with the other components of computer system 510 via bus 516. It should be understood that although not shown, other hardware and software components, such as microcode, device drivers, redundant processing units, external disk drive arrays, RAID systems, tape drives, and data archival storage systems may be used in conjunction with computer system 510.

The flowcharts and block diagrams illustrate the architecture, functionality, and operation of possible implementations of methods and systems according to various embodiments of the present invention. In this regard, each block in the flowcharts or block diagrams may represent a module, segment, or portion of code, which comprises one or more executable instructions for implementing the specified logical functions. It should be noted that, in some alternative implementations, the functions noted in the blocks may occur out of the order noted. For example, two blocks shown in succession may, in fact, be executed substantially concurrently, or the blocks may sometimes be executed in the reverse order, or the blocks may sometimes be executed any number of steps prior to, or subsequent to, their current place in the order, depending on the functionality involved.

The terminology used herein is for the purpose of describing particular embodiments only and is not intended to be limiting of the invention. It should be appreciated that any particular nomenclature herein is used merely for convenience and thus, the invention should not be limited to use solely in any specific function identified and/or implied by such nomenclature. Furthermore, as used herein, the singular forms of "a," "an," and "the" are intended to include the plural forms as well, unless the context clearly indicates otherwise.

The description of the present invention has been presented for purposes of illustration and description, but is not intended to be exhaustive or limited to the invention in the form disclosed. Many modifications and variations will be apparent to persons of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method for creating and editing hybrid applications on a mobile device, the method comprising:
    searching, by one or more computer processors, one or more exposed features of a plurality of currently installed applications on the mobile device;
    exposing, by one or more computer processors, an application-based workspace installed on the mobile device, the workspace providing a business process model and notation graphical programming language for creating and editing hybrid applications on the mobile device;
    presenting, by one or more computer processors, a plurality of business process model and notation symbols representing one or more programming functions, wherein the plurality of business process model and notation symbols include an activity, a sequence flow, a gateway, a parallel process, a start and an end, an event, and a looping function, wherein each of the plurality of business process model and notation symbols automate a programming process for creating and editing hybrid applications;
    presenting, by one or more computer processors, a plurality of features made available by the plurality of currently installed applications;
    receiving, by one or more computer processors, a plurality of selections in a workflow canvas of the workspace, wherein the plurality of received selections includes at least: a business process model and notation symbol representing a first feature of a first application, a business process model and notation symbol representing a second feature of a second application, a business process model and notation symbol automating a programming function capable of linking sequentially, or in parallel, the first feature of the first application and the second feature of the second application, and a business process model and notation symbol representing a configured start event, wherein an occurrence of the configured start event automates the linking of the first feature of the first application and the second feature of the second application;
    receiving, by one or more computer processors, a configuration of the plurality of received selections in the workflow canvas of the workspace, wherein the configuration is a graphical representation sequence flow for automation of a developing hybrid application;
    determining, by one or more computer processors, based on the configuration, the developing hybrid application is complete; and
    prompting, by one or more computer processors, to save the developing hybrid application.

2. The method of claim 1 further comprises, prior to searching one or more exposed features of a plurality of currently installed applications on the mobile device, issuing, by one or more computer processors, a prompt, the prompt including at least one of options: to create a hybrid application and to edit an existing hybrid application.

3. The method of claim 1, wherein searching one or more exposed features of the plurality of currently installed applications on the mobile device, further comprises at least one of:
    searching, by one or more computer processors, the mobile device for the plurality of currently installed applications prior to receiving confirmation of at least one of options: to create a hybrid application and to edit an existing hybrid application;
    searching, by one or more computer processors, the mobile device for one or more features made available by the plurality of currently installed applications; and
    searching, by one or more computer processors, the mobile device for the plurality of currently installed applications subsequent to receiving confirmation of at least one of options: to create a hybrid application and to edit an existing hybrid application.

4. The method of claim 1, wherein exposing the workspace, further comprises:
    displaying, by one or more computer processors, the workflow canvas for receiving a plurality of selections within the workspace;

displaying, by one or more computer processors, the workflow canvas for configuring the plurality of selections within the workspace; and displaying, by one or more computer processors, the workflow canvas for manipulating the plurality of selections within the workspace;

wherein the plurality of selections within the workspace include: a start event, an activity, a function of the mobile device, a feature of the mobile device, the business process model and notation symbol representing a programming function, and an end event.

5. The method of claim 1, wherein exposing the workspace, further comprises:

presenting, by one or more computer processors, a plurality of functions available on the mobile device; and presenting, by one or more computer processors, a plurality of settings for configuring programming operations;

wherein each of the presenting steps above includes presenting through one or more of: a drop-down box, an organized folder, or a graphical user interface.

6. The method of claim 1, wherein determining, based on the configuration, the developing hybrid application is complete, further comprises:

determining, by one or more computer processors, the selections are configured to enable automation of the sequence flow for the developing hybrid application;

receiving, by one or more computer processors, an indication from the user that information to complete development of the developing hybrid application has been provided; and determining, by one or more computer processors, the developing hybrid application satisfies a test device or a simulator configured to confirm the developing hybrid application performs as intended.

7. The method of claim 1, wherein prompting to save the developing hybrid application, further comprises:

creating, by one or more computer processors, a plurality of reference data for the developing hybrid application; and prompting, by one or more computer processors, to assign one or more of: a file name, an icon file, and a unique identifier to the developing hybrid application.

8. A computer program product for creating and editing hybrid applications on a mobile device, the computer program product comprising:

one or more computer-readable storage memory and program instructions stored on the one or more computer-readable storage memory, the program instructions comprising:

program instructions to search one or more exposed features of a plurality of currently installed applications on the mobile device;

program instructions to expose an application-based workspace installed on the mobile device, the workspace providing a business process model and notation graphical programming language for creating and editing hybrid applications on the mobile device;

program instructions to present, by one or more computer processors, a plurality of business process model and notation symbols representing one or more programming functions, wherein the plurality of business process model and notation symbols include an activity, a sequence flow, a gateway, a parallel process, a start and an end, an event, and a looping function, wherein each of the plurality of business process model and notation symbols automate a programming process for creating and editing hybrid applications;

program instructions to present, by one or more computer processors, a plurality of features made available by the plurality of currently installed applications;

program instructions to receive a plurality of selections in a workflow canvas of the workspace, wherein the plurality of received selections includes at least: a business process model and notation symbol representing a first feature of a first application, a business process model and notation symbol representing a second feature of a second application, a business process model and notation symbol automating a programming function capable of linking sequentially, or in parallel, the first feature of the first application and the second feature of the second application, and a business process model and notation symbol representing a configured start event, wherein an occurrence of the configured start event automates the linking of the first feature of the first application and the second feature of the second application;

program instructions to receive a configuration of the plurality of received selections in the workflow canvas of the workspace, wherein the configuration is a sequence flow for automation of a developing hybrid application;

program instructions to determine, based on the configuration, the developing hybrid application is complete; and program instructions to prompt to save the developing hybrid application.

9. The computer program product of claim 8 further comprises, prior to searching one or more exposed features of a plurality of currently installed applications on the mobile device, program instructions to issue a prompt, the prompt including at least one of options: to create a hybrid application and to edit an existing hybrid application.

10. The computer program product of claim 8, wherein program instructions to search one or more exposed features of a plurality of currently installed applications on the mobile device, further comprises at least one of:

program instructions to search the mobile device for a plurality of currently installed applications prior to receiving confirmation of at least one of options: to create a hybrid application and to edit an existing hybrid application;

program instructions to search the mobile device for one or more features made available by a plurality of currently installed applications; and program instructions to search the mobile device for a plurality of currently installed applications subsequent to receiving confirmation of at least one of options: to create a hybrid application and to edit an existing hybrid application.

11. The computer program product of claim 8, wherein exposing the workspace, further comprises:

program instructions to display the workflow canvas for receiving a plurality of selections within the workspace;

program instructions to display the workflow canvas for configuring a plurality of selections within the workspace; and program instructions to display the workflow canvas for manipulating a plurality of selections within the workspace;

wherein the plurality of selections within the workspace include: a start event, an activity, a function of the mobile device, a feature of the mobile device, a business process model and notation symbol representing a programming function, and an end event.

12. The computer program product of claim 8, wherein program instructions to expose the workspace, further comprises:
- program instructions to present a plurality of functions available on the mobile device; and
- program instructions to present a plurality of settings for configuring programming operations;
- wherein each of the presenting steps above includes presenting through one or more of: a drop-down box, an organized folder, or a graphical user interface.

13. The computer program product of claim 8, wherein program instructions to determine, based on the configuration, the developing hybrid application is complete, further comprises:
- program instructions to determine the selections are configured to enable automation of the sequence flow for the developing hybrid application
- program instructions to receive an indication from the user that information to complete development of the developing hybrid application has been provided; and
- program instructions to determine the application satisfies a test device or a simulator configured to confirm the developing hybrid application performs as intended.

14. The computer program product of claim 8, wherein program instructions to prompt to save the developing hybrid application, further comprises:
- program instructions to create a plurality of reference data for the developing hybrid application; and
- program instructions to prompt to assign one or more of: a file name, an icon file, and a unique identifier to the developing hybrid application.

15. A computer system for creating and editing hybrid applications on a mobile device, the system comprising:
- one or more computer processors;
- one or more computer-readable storage memory;
- program instructions stored on at least one of the one or more computer-readable storage memory for execution by at least one of the one or more computer processors, the program instructions comprising:
  - program instructions to search one or more exposed features of a plurality of currently installed applications on the mobile device;
  - program instructions to expose an application-based workspace installed on the mobile device, the workspace providing a business process model and notation graphical programming language for creating and editing hybrid applications on the mobile device;
  - program instructions to present, by one or more computer processors, a plurality of business process model and notation symbols representing one or more programming functions, wherein the plurality of business process model and notation symbols include an activity, a sequence flow, a gateway, a parallel process, a start and an end, an event, and a looping function, wherein each of the plurality of business process model and notation symbols automate a programming process for creating and editing hybrid applications;
  - program instructions to present, by one or more computer processors, a plurality of features made available by the plurality of currently installed applications;
  - program instructions to receive a plurality of selections in a workflow canvas of the workspace, wherein the plurality of received selections includes at least: a business process model and notation symbol representing a first feature of a first application, a business process model and notation symbol representing a second feature of a second application, a business process model and notation symbol automating a programming function capable of linking sequentially, or in parallel, the first feature of the first application and the second feature of the second application, and a business process model and notation symbol representing a configured start event, wherein an occurrence of the configured start event automates the linking of the first feature of the first application and the second feature of the second application;
  - program instructions to receive a configuration of the plurality of received selections in the workflow canvas of the workspace, wherein the configuration is a graphical representation sequence flow for automation of a developing hybrid application;
  - program instructions to determine, based on the configuration, the developing hybrid application is complete; and
  - program instructions to prompt to save the developing hybrid application.

16. The computer system of claim 15, wherein program instructions to search one or more exposed features of a plurality of currently installed applications on the mobile device, further comprises at least one of:
- program instructions to search the mobile device for a plurality of currently installed applications prior to receiving confirmation of at least one of options: to create a hybrid application and to edit an existing hybrid application;
- program instructions to search the mobile device for one or more features made available by a plurality of currently installed applications; and
- program instructions to search the mobile device for a plurality of currently installed applications subsequent to receiving confirmation of at least one of options: to create a hybrid application and to edit an existing hybrid application.

17. The computer system of claim 15, wherein exposing the workspace, further comprises:
- program instructions to display the workflow canvas for receiving a plurality of selections within the workspace;
- program instructions to display the workflow canvas for configuring a plurality of selections within the workspace; and
- program instructions to display the workflow canvas for manipulating a plurality of selections within the workspace;
- wherein the plurality of selections within the workspace include a start event, an activity, a function of the mobile device, a feature of the mobile device, a business process model and notation symbol representing a programming function, and an end event.

18. The computer system of claim 15, wherein program instructions to expose the workspace, further comprises:
- program instructions to present a plurality of functions available on the mobile device; and
- program instructions to present a plurality of settings for configuring programming operations;
- wherein each of the presenting steps above includes presenting through one or more of: a drop-down box, an organized folder, or a graphical user interface.

19. The computer system of claim 15, wherein program instructions to determine, based on the configuration, the developing hybrid application is complete, further comprises:
- program instructions to determine the selections are configured to enable automation of the sequence flow for the developing hybrid application program instructions to receive an indication from the user that information to complete development of the developing hybrid application has been provided; and program instructions to determine the developing hybrid application satisfies a test device or a simulator configured to confirm the developing hybrid application performs as intended.

20. The computer system of claim 15, wherein program instructions to prompt to save the developing hybrid application, further comprises:

program instructions to create a plurality of reference data for the developing hybrid application; and program instructions to prompt to assign one or more of: a file name, an icon file, and a unique identifier to the developing hybrid application.

* * * * *